2,928,744

PREPARATION OF FRUIT JUICES

James D. Ponting, El Cerrito, Calif., assignor to the United States of America as represented by the Secretary of Agriculture No Drawing. Application December 3, 1958
Serial No. 778,037

7 Claims. (Cl. 99—105)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates in general to processes for preparing fruit juices. A particular object of the invention is the provision of processes for preparing fruit juices wherein the natural color of the fruit is retained. Further objects and advantages of the invention will be obvious from the following description, wherein parts and percentages are by weight unless otherwise specified.

In the following description, the invention will be explained particularly in connection with preparation of apple juice as an illustrative example. It is to be understood however that the invention is not restricted to apple juice but is of application to fruit juices in general.

In the conventional process of preparing apple juice, fresh apples are crushed and pressed to separate the juice from the fibrous parts of the fruit. The crushing step is usually carried out in a hammermill or similar device. The crushed fruit is then pressed in a bag press, wine press, or the like. The juice so produced, though a flavorsome and nutritious beverage, does not have a natural color but is of a tan, amber, or brown color depending on the variety and maturity of the fruit and the time of exposure to air after disruption of the natural tissue structure. The color change is believed to involve an oxidation of labile components of the fruit catalyzed by enzymes naturally present in the tissues. The art is aware of this problem and various proposals have been made to avoid this undesirable browning effect. Many chemical agents have been advocated to be added to prevent the color change but none are satisfactory either because they do not effectively inhibit enzyme action or because they damage the flavor of the juice. Citric acid is an example of the former; sulphur dioxide is an example of the latter.

In accordance with the invention, discoloration of the juice is prevented by comminuting the fruit in the presence of added essentially pure malic acid. It is necessary for the malic acid to be present at substantially the very moment when the natural tissue structure is disrupted. For this reason the malic acid is applied to the fruit prior to subjecting it to comminution or while the fruit is undergoing comminution. The malic acid may be employed as such or in the form of aqueous solutions thereof. In one embodiment of the invention, the fruit is sprayed with a solution of malic acid then comminuted. In another embodiment, malic acid in solid or dissolved form is added to the fruit while it is being comminuted. In any case, the comminuted fruit containing the added malic acid is then pressed in conventional manner whereby there is obtained a juice of natural color.

The proportion of malic acid required in the process of the invention will vary depending on such factors as the type of fruit, maturity of the fruit. In general, a proportion of malic acid about from 0.5 to 4%, based on the weight of the fruit is used. In any particular case the proper amount of malic acid can be easily determined by conducting a few trials with varying amounts of this compound and noting the color of the juice in each case.

A particular advantage of the process of the invention is that malic acid is a natural constituent of almost all fruit juices hence there is no introduction of any "foreign" material.

It is realized that the juice prepared as described above may be considered too sour for some palates (due to addition of the malic acid). If it is desired to remedy this factor, the juice may be treated in any of various ways to remove excess acid. One procedure is to add to the juice sufficient calcium carbonate or calcium hydroxide to restore the pH to the natural level. The excess malic acid will then precipitate as calcium malate. This precipitate can be readily removed by filtration. The necessary amount of calcium carbonate or hydroxide can also be determined by stoichiometry, that is, by using an amount of the calcium compound equivalent to the malic acid added during the comminuting step. Another method of removing excess malic acid from the juice involves passing the juice through a column of an anion exchanger whereby the excess malic acid is adsorbed. In this process, the proportion of juice and exchanger are so selected that the effluent juice has approximately its natural pH, that is, the pH it would have without the added malic acid. In the alternative, the lot of juice containing the added malic acid may be divided into two batches. The first batch is treated with the anion exchanger to remove essentially all the fruit acids and the effluent is blended with the second batch of juice to provide a composite juice of proper acidity. Where the ion exchange method is employed, malic acid may be recovered from the anion exchanger by eluting it with an aqueous solution of a mineral acid such as sulphuric or phosphoric. The effluent containing the malic acid, after evaporation of part or all of the water, may be used to treat another batch of fruit to be juiced.

The juices prepared in accordance with the invention may be preserved in any of the usual ways. For example they may be preserved by pasteurizing followed by sealing in bottles or cans. In the alternative they may be preserved by freezing. The juices may also be concentrated and the concentrated juices preserved by canning or freezing. Dehydrated products may be prepared from the concentrated juices by vacuum dehydration procedures.

Although the process of the invention is particularly useful for preparing apple juice, it may be employed in preparing juices from any fruit. The method is especially useful with light-colored fruits wherein browning is an especial problem, i.e., pears, peaches, apricots, green or yellow grapes, nectarines, plums, and the like.

The invention is further demonstrated by the following examples. Procedures not in accordance with the invention are included for purposes of comparison.

Example I

One hundred parts of fresh apples and one part of malic acid were ground in an electric blender. The resulting pulp was pressed through cloth to separate the juice from the fibrous material.

Sufficient calcium hydroxide was stirred into the juice to establish a pH of 3.8 (the original pH of the apples). The juice was then filtered to remove precipitated calcium malate. The resulting juice had a fresh apple flavor and a natural color.

Example II

A series of juices were made from a single lot of fresh apples according to the following procedures:

Fresh apples (100 parts) were ground in an electric blender with or without added ingredients, as specified below. In run 1, nothing was added; in run 2, citric acid (1 part) was added; in run 3, malic acid (1 part) was added; in run 4, malic acid (2 parts) was added.

The pulps produced as described above were pressed through cloth to separate the juice from the fibrous materials. Samples of the juice were then allowed to stand exposed to the air for 24 hours. After this period of time the color of the samples was noted.

The results obtained are tabulated below:

| Run | Added ingredient | Color of juice |
| --- | --- | --- |
| 1 | none | brown. |
| 2 | citric acid, 1% | Do. |
| 3 | malic acid, 1% | natural. |
| 4 | malic acid, 2% | Do. |

Having thus described the invention, what is claimed is:

1. A method for preparing fruit juices having a natural fruit color which comprises comminuting fresh fruit in the presence of added essentially pure malic acid and separating the juice from the resulting pulp.

2. The method of claim 1 wherein the fruit is apple.

3. A method for preparing fruit juices having a natural fruit color which comprises comminuting fresh fruit in the presence of added essentially pure malic acid, separating the juice from the resulting pulp, and removing excess malic acid from the juice.

4. The method of claim 3 wherein the fruit is apple.

5. The method of claim 3 wherein the excess malic acid is removed from the juice by precipitation with calcium hydroxide.

6. The method of claim 3 wherein the excess malic acid is removed from the juice by precipitation with calcium carbonate.

7. The method of claim 3 wherein the excess malic acid is removed from the juice by adsorption on an anion exchanger.

References Cited in the file of this patent

Text, "Fruit and Vegetable Juice Production," by Donald K. Tressler and Maynard A. Joslyn, published by AVI Publishing Co., Inc., New York, N.Y., 1954, pp. 507, 511, 513, 515 and 649.